US012584591B2

(12) United States Patent
Hotta et al.

(10) Patent No.: US 12,584,591 B2
(45) Date of Patent: Mar. 24, 2026

(54) GAS SUPPLY SYSTEM

(71) Applicant: TOYOTA JIDOSHA KABUSHIKI KAISHA, Toyota (JP)

(72) Inventors: Yutaka Hotta, Toyota (JP); Koji Sugiura, Toyota (JP); Chihiro Uchimura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 216 days.

(21) Appl. No.: 18/494,741

(22) Filed: Oct. 25, 2023

(65) Prior Publication Data

US 2024/0209989 A1 Jun. 27, 2024

(30) Foreign Application Priority Data

Dec. 22, 2022 (JP) ................................. 2022-205541

(51) Int. Cl.
*F17C 13/02* (2006.01)
*F17C 13/04* (2006.01)

(52) U.S. Cl.
CPC ............ *F17C 13/025* (2013.01); *F17C 13/04* (2013.01); *F17C 2205/0335* (2013.01); *F17C 2250/043* (2013.01); *F17C 2250/0636* (2013.01)

(58) Field of Classification Search
CPC .............................. F17C 13/025; F17C 13/04; F17C 2205/0335; F17C 2205/0326; F17C 2250/043; F17C 2250/0636; Y10T 137/87925; Y10T 137/87965
See application file for complete search history.

(56) References Cited

U.S. PATENT DOCUMENTS

| | | | | |
|---|---|---|---|---|
| 6,840,277 | B1 * | 1/2005 | Nimberger | F16L 29/04 137/68.14 |
| 2010/0140518 | A1 * | 6/2010 | Billings | F16K 3/24 251/129.01 |
| 2014/0209179 | A1 * | 7/2014 | Maier | F02D 41/222 137/12 |
| 2018/0138528 | A1 * | 5/2018 | Komiya | H01M 8/04201 |
| 2019/0063686 | A1 * | 2/2019 | Ogiwara | G01M 3/2815 |
| 2019/0157694 | A1 * | 5/2019 | Uchimura | H01M 8/04302 |
| 2020/0096158 | A1 * | 3/2020 | Ehgartner | F17C 7/00 |
| 2020/0386369 | A1 * | 12/2020 | Ito | F17C 13/023 |

FOREIGN PATENT DOCUMENTS

| | | | |
|---|---|---|---|
| JP | 2008275075 A | | 11/2008 |
| JP | 2016157522 A | * | 9/2016 |

* cited by examiner

*Primary Examiner* — Jessica Cahill
(74) *Attorney, Agent, or Firm* — Hunton Andrews Kurth LLP

(57) ABSTRACT

A tank of a gas supply system is configured to be detachably attached to a gas consumption device. A control device is configured to, when the tank is detached, close an open/close valve to stop supply of gas from the tank, stop consumption of gas by the gas consumption device after the gas in the supply channel is consumed, and perform computation to permit detachment of the tank after confirming that pressure acquired from a pressure sensor is not rising to a predetermined level or higher.

6 Claims, 7 Drawing Sheets

GAS SUPPLY SYSTEM

CROSS-REFERENCE TO RELATED APPLICATION

This application claims priority to Japanese Patent Application No. 2022-205541 filed on Dec. 22, 2022, incorporated herein by reference in its entirety.

BACKGROUND

1. Technical Field

The present disclosure relates to a gas supply system.

2. Description of Related Art

Japanese Unexamined Patent Application Publication No. 2008-275075 (JP 2008-275075 A) discloses a system for supplying gas from a high-pressure tank to a fuel cell.

SUMMARY

There is a concern that a large amount of leakage may occur when the high-pressure tank is detached from the system, such as when the high-pressure tank is replaced or the like. There is demand for detachability of a high-pressure tank in which such leakage is suppressed.

The present disclosure provides a gas supply system in which the tank can be detached while suppressing trouble of leak occurrence in a more sure manner.

A gas supply system according to an embodiment of the present disclosure includes a gas consumption device, a tank, and a control device. The tank is configured to store gas to be supplied to the gas consumption device, and is configured to be detachably attached from the gas consumption device. The gas consumption device includes a supply channel configured such that the gas flows through the supply channel, and a pressure sensor configured to obtain in-channel pressure of the supply channel. The tank is configured to be connected to the supply channel, and is provided with an open/close valve at a portion where the tank is connected to the supply channel. The control device is configured such that, when the tank is detached from the gas consumption device, the control device closes the open/close valve to stop supply of gas from the tank, stops consumption of the gas by the gas consumption device after the gas in the supply channel is consumed, and performs computation to permit detachment of the tank after obtaining pressure from the pressure sensor and confirming that the pressure is not rising to a predetermined level or higher.

The gas consumption device may include a locking member that is configured to restrict detachment of the tank from the gas consumption device. The control device may be configured to perform operations to release restriction by the locking member when the detachment of the tank is permitted.

The open/close valve may be a check valve. The gas consumption device may include a push rod. The check valve may be configured to open by the push rod pressing the check valve, and to close by the push rod releasing pressing of the check valve. The control device may be configured to perform operations of the push rod such that the check valve is in a closed state when the tank is detached.

The open/close valve of the tank may be configured to be a solenoid valve.

The control device may be configured to output a result to be externally notified when a computation result that does not permit the detachment of the tank is obtained.

The gas supply system may include a receiver that receives the result to be externally notified and performs notification.

When a value of the pressure sensor on the supply channel rises after the gas supply from the tank is stopped, the open/close valve is conceivably malfunctioning, and there is concern about leakage. Accordingly, obtaining the value of the pressure sensor enables the state of the open/close valve to be checked in advance, and the tank can be removed (detached) in a state with leakage suppressed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

1. Gas Supply System

Figure 1:
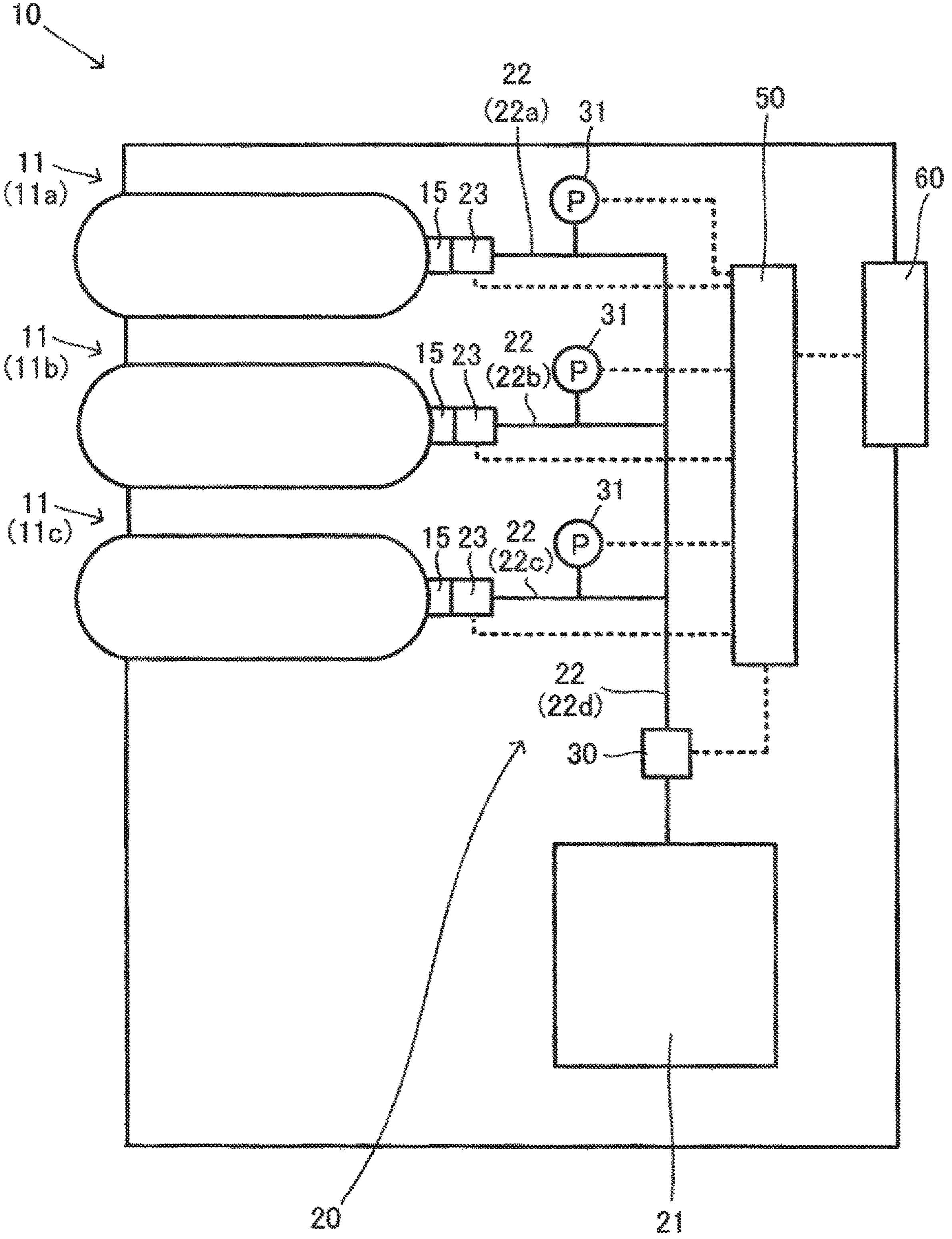
FIG. 1 is a diagram illustrating a configuration of a gas supply system.

FIG. 1 conceptually illustrates a configuration of a gas supply system 10 according to an embodiment. Such a gas supply system 10 has a tank 11 that is a supply source of gas, a gas consumption device 20 that is a supply destination to which to supply gas from the tank 11, a control device 50, and a notification device 60. The gas supply system 10 according to the present embodiment is a system that supplies hydrogen stored in the tank 11 to a fuel cell 21 included in the gas consumption device 20 to generate electricity. Further, in the present embodiment, the tank 11 is configured to be detachably attached to the gas consumption device 20. This will be described in detail below.

1.1. Tank

Figure 2A:
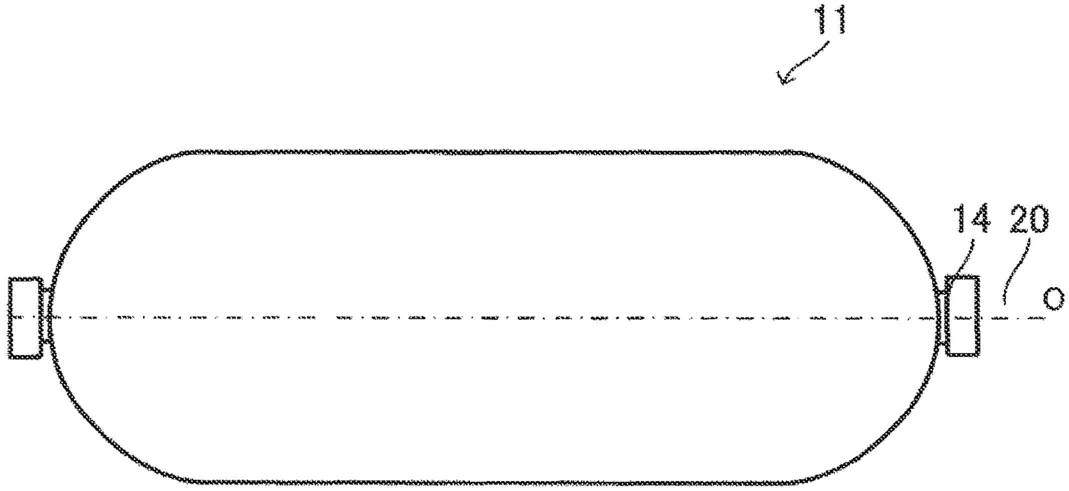
FIG. 2A is an external view illustrating a configuration of a tank.
Figure 2B:
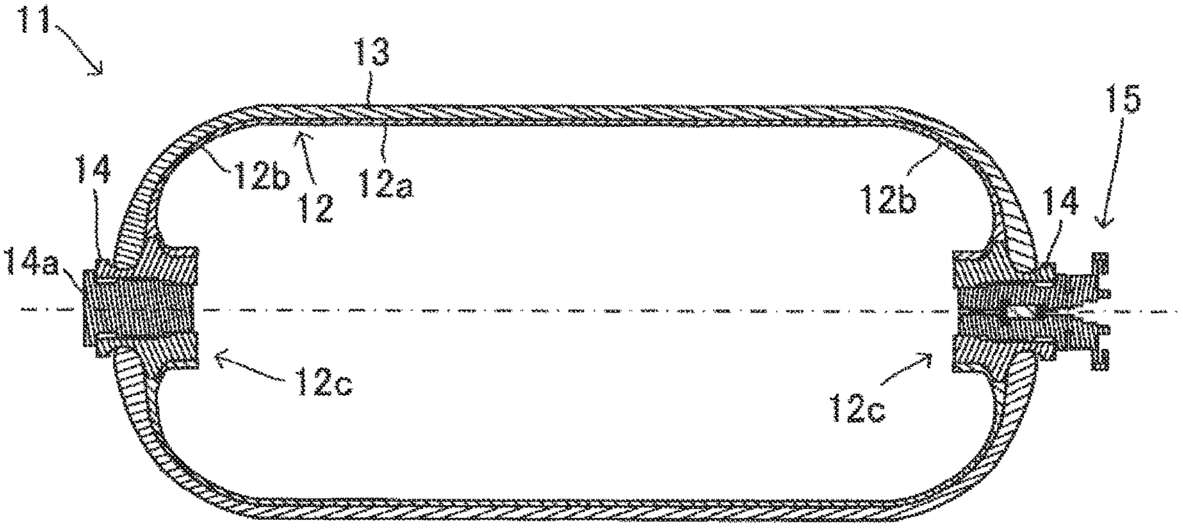
FIG. 2B is a sectional view taken along an axial direction of the tank.

The tank 11 is a container for storing gas to be supplied (hydrogen in the present embodiment) in a liquid state or a gaseous state. FIGS. 2A and 2B are diagrams for description thereof. FIG. 2A is an external view of the tank 11. FIG. 2B is a sectional view taken along an axial direction of the tank 11. As can be understood from these diagrams, the tank 11 according to the present embodiment includes a liner 12, a reinforcing layer 13, necks 14, and an open/close valve 15. Each configuration will be described below.

1.1.1. Liner

The liner 12 is a hollow member that defines internal space of the tank 11, and has a cylindrical shape in the present embodiment. The liner 12 has a body 12*a* that is cylindrically formed with a substantially constant diameter, openings at both ends of the body 12*a* are narrowed by side end portions 12*b* that are dome-shaped, and necks 14 are disposed at openings 12*c* that are narrowed. It is sufficient for the liner 12 to be made of a material that can hold that which is contained in the internal space thereof (e.g., hydrogen) without leaking, and various types of materials can be used. Specifically, examples of materials for the liner 12 include nylon resins, polyethylene-based synthetic resins, metals such as stainless steel, aluminum, and so forth. From the viewpoint of reducing the weight of the tank, the material making up the liner 12 is preferably a synthetic resin. The thickness of the liner 12 is preferably 0.5 mm to 3.0 mm, although not limited thereto in particular.

1.1.2. Reinforcing Layer

The reinforcing layer 13 has a plurality of layers of laminated fibers, and resin with which the fibers are impregnated, and which is cured. The fiber layers are made up of a fiber bundle wound around an outer periphery of the liner 12 in a plurality of layers to a predetermined thickness. The thickness of the reinforcing layer 13 and the number of turns of the fiber bundle are not limited in particular, since these are determined by the required strength of the reinforcing layer 13, but the thickness thereof is around 10 mm to 30 mm.

Fiber Bundle

Carbon fibers, for example, are used for the fiber bundle of the reinforcing layer 13. The fiber bundle is formed by bundling carbon fibers, and has a band-like shape with a predetermined cross-sectional shape (e.g., a rectangular cross-section). The cross-sectional shape of the fiber bundle may be a rectangle with a width of around 6 mm to 20 mm, and a thickness of around 0.1 mm to 0.3 mm, although not limited thereto in particular. An example of the amount of carbon fibers included in the fiber bundle is around 36,000 carbon fibers, although the fiber bundle is not limited thereto in particular.

Impregnating Resin

The resin with which the fibers (fiber bundle) are impregnated and cured in the reinforcing layer 13 is not limited in particular, as long as the strength of the fibers can be increased. Examples of such resins include thermosetting resins that are cured by heat, specific examples thereof including epoxy resins containing amine-based or anhydride-based curing accelerators and rubber-based reinforcing agents, unsaturated polyester resins, and so forth. In addition, another example is a resin composition having an epoxy resin as a main agent, which is cured by a curing agent being mixed therein. In this case, the resin composition, which is a mixture, is allowed to reach and permeate the fiber layer during a period following the main agent and the curing agent being mixed and before curing occurs. The mixture is automatically cured by mixing the main agent and the curing agent.

Protective Layer

A protective layer may be disposed on an outer periphery of the reinforcing layer 13 as necessary. The protective layer is formed, for example, by impregnating glass fibers wound about the reinforcing layer 13 with a resin. The impregnating resin can be thought of as being similar to that of the reinforcing layer 12. Impact resistance can be imparted to the tank 11 by the protective layer. The thickness of the protective layer can be around 1.0 mm to 1.5 mm, although not limited thereto in particular.

1.1.3. Necks

The necks 14 are members attached to each of the two openings 12*c* of the liner 12. The necks 14 are respectively disposed at both ends of the liner 12 in a direction of an axis O. The necks 14 function as openings for communicating between the inside and outside of the tank 11, and the open/close valve 15 is attached to one of the necks 14. Accordingly, this neck 14 is provided with a hole having a circular cross section in which the open/close valve 15 is disposed. An inner face of the hole has a female screw thread corresponding to a male screw thread of the open/close valve 15. The open/close valve 15 is fixed to the neck 14 by combining this female screw thread with the male screw thread of the open/close valve 15. Also, the inner face of the hole has a sealing face which is a smooth surface on the inner side of the tank (high pressure side) from the female screw thread. A seal member provided on an outer periphery of the open/close valve 15 comes into contact with this seal surface, to realize airtightness (sealing) of inside of the tank 11.

The members making up the necks 14 are not limited in particular, as long as required strength is obtained, and examples thereof include copper, iron, aluminum, and so forth.

1.1.4. Open/Close Valve

Figure 3:
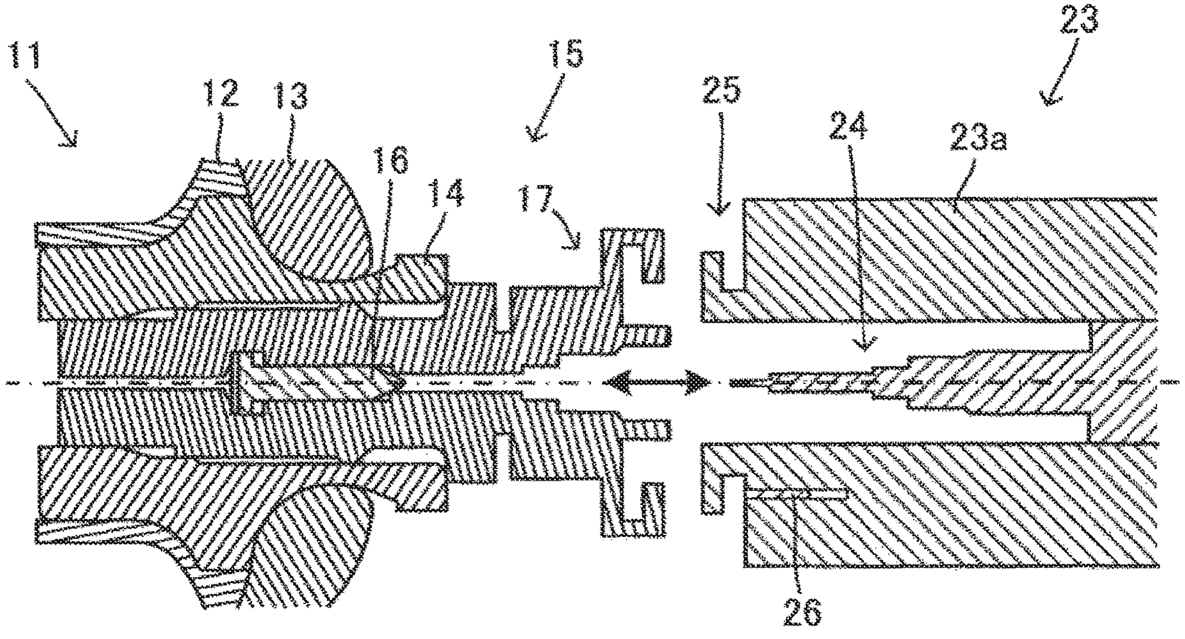
FIG. 3 is a diagram for describing an open/close valve and a connecting device.

The open/close valve 15 is held in the hole of the neck 14 so as to bridge the inside and outside of the tank 11. The open/close valve 15 is disposed on one of the two necks 14 provided at both ends of the tank 11 in a longitudinal direction. Note that a plug 14*a* is disposed and sealed in the neck 14 on the other side. FIG. 3 is a diagram including the vicinity of the open/close valve 15 in FIG. 2B, and is a diagram illustrating a state in which the open/close valve 15, and a connecting device 23 of the gas consumption device 20 to be described later, are separated. The open/close valve 15 has a shaft portion to be disposed inside the hole of the neck 14. An outer peripheral face of the shaft portion is provided with a male screw thread that is combined with a female screw thread of the neck 14. The open/close valve 15 is fixed to the hole of the neck 14 by combining the female screw thread with the male screw thread. Also, a sealing member (omitted from illustration) is disposed on the outer peripheral face of the open/close valve 15. This sealing member is disposed so as to come into contact with the sealing face on the inner face of the hole of the neck 14 to realize airtightness (sealing).

The open/close valve 15 has a valve element 16 and a connecting portion 17.

Valve Element

The valve element 16 is a switching valve that permits and restricts communication between the inside and outside of the tank 11. A check valve is applied as the valve element 16 in the present embodiment. Accordingly, in the present embodiment, the valve element 16 is biased so as to restrict the communication when the valve is closed, and pressing the valve element 16 against the biasing force moves the valve element 16, and the communication is permitted. Thus, according to the present embodiment, pressing and releasing pressing of the valve element 16 switches communication between the inside and the outside of the tank 11, and accordingly means for pressing the valve element 16 are necessary. Accordingly, the gas consumption device 20 is provided with means (a push rod 24) for pressing the valve element 16, which will be described later. By using a check valve as the valve element 16, and performing opening/closing thereof at the side of the gas consumption device 20, there is no need to electrically connect the tank 11 that is detachably attached to the gas consumption device 20 to the control device 50 for control, and control by the control device 50 can be performed in a more sure manner.

Thus, an example in which a check valve is applied as the valve element 16 is shown in the present embodiment, but this is not limiting as long as communication between the inside and outside of the tank 11 can be permitted and restricted, and a solenoid valve can be applied as the valve element. Using a solenoid valve enables the opening/closing to be directly controlled by the control device 50 without using pressing means.

Connecting Portion

The open/close valve 15 has the connecting portion 17 connected to the gas consumption device 20, on the side thereof that is connected to the gas consumption device 20. The connecting portion 17 is a part that enables engaging and detaching of the connecting portion 17 and the connecting portion 25 of the connecting device 23 of the gas consumption device 20. Although specific forms thereof are not limited, a mechanical coupling (mechanical interface) can be given in the present embodiment. Among these, a mount such as that for connecting a photography lens to a main body of a camera can be applied. More specifically, a C-mount can be used. Note that in the present embodiment, the gas consumption device 20 is provided with a locking member 26, which will be described later. A configuration is made such that operation of the locking member 26 disables detaching of the connecting portion 17 and the gas consumption device 20. Also, a configuration is made such that releasing the locking member 26 enables detaching of the connecting portion 17 and the gas consumption device 20.

1.1.5 Others

Allowable pressure of the tank 11 is not limited in particular. The tank 11 may be a tank capable of storing hydrogen at an allowable pressure of more than 20 MPa to 70 MPa or less from the viewpoint of capability of supplying a greater amount of hydrogen. The present embodiment enables leakage to be averted in a more sure manner at the time of detachment, even with such high-pressure tanks.

In the present embodiment, a plurality (e.g., three) of the tanks 11 is provided, and each tank 11 is filled with hydrogen. An example in which three tanks 11 are disposed is given here. The three tanks are denoted by respective signs 11*a*, 11*b*, and 11*c*, for distinguishing thereamong. In the present embodiment, the three tanks 11*a*, 11*b*, and 11*c* may be collectively referred to as "tank 11" or "tanks 11". These tanks 11*a*, 11*b*, and 11*c* may all have the same capacity, or may include tanks with different capacities.

1.2. Gas Consumption Device

The gas consumption device 20 is the gas supply destination of the tank 11, and is a device that receives and consumes gas. In the present embodiment, the gas consumption device 20 includes the fuel cell 21, a supply channel 22, the connecting devices 23, an injector 30, and pressure gauges 31, as illustrated in FIG. 1.

1.2.1. Fuel Cell

The fuel cell 21 is equipment that consumes gas supplied thereto, and receives supply of hydrogen from the tank 11 and also receives supply of air from an air inlet (omitted from illustration) to generate electricity. The specific configuration of the fuel cell 21 is not limited in particular, and various configurations can be used.

1.2.2. Supply Channel

The supply channel 22 is a route for guiding gas from the tank 11 to the fuel cell 21, and is made up of pipes. In the present embodiment, each of the tanks 11*a*, 11*b*, and 11*c* and the fuel cell 21 are connected. Here, pipes 22*a*, 22*b*, and 22*c* extending from the tanks 11*a*, 11*b*, and 11*c*, respectively, join to form one pipe 22*d*, which is connected to the fuel cell 21.

1.2.3. Connecting Device

The connecting device 23 is disposed on the supply channel 22, at a connecting portion between the supply channel 22 and the tank 11. The connecting device 23 is connected to the connecting portion 17 provided in the open/close valve 15 of the tank 11 and operates to open and close the valve element 16 (check valve) of the tank 11. FIG. 3 is a diagram including the vicinity of the connecting device 23 in FIG. 2B, and is a diagram illustrating a state in which the open/close valve 15, and the connecting device 23 of the gas consumption device 20 are separated. As can be understood from FIG. 3, the connecting device 23 has a cylindrical body 23*a*, the push rod 24 disposed inside the cylindrical body 23*a*, the connecting portion 25 provided at a distal end of the cylindrical body 23*a*, and the locking member 26.

Push Rod

The push rod 24 is a member that is capable of pressing the valve element 16 provided in the open/close valve 15 of the tank 11. In the present embodiment, the push rod 24 is rod-shaped, and is capable of pressing the valve element 16 with a distal end thereof. Accordingly, as can be understood from FIG. 3, the push rod 24 is disposed inside the cylindrical body 23*a*, and is configured to be capable of moving in the axial direction of the push rod 24 as indicated by a straight arrow in FIG. 3, so as to project from and withdraw into the cylindrical body 23*a*.

Connecting Portion

The connecting portion 25 is provided at the end of the cylindrical body 23*a*, on the side thereof facing the connecting portion 17 provided to the open/close valve 15. The connecting portion 25 can be engaged with and detached from the connecting portion 17, as described above. Specifically, in the present embodiment, a mechanical coupling (mechanical interface) can be given. Among these, a mount such as that for connecting a photography lens to a main body of a camera can be applied. More specifically, a C-mount can be used.

Locking Member

The locking member 26 is a member that restricts release of the engagement between the connecting portion 17 and the connecting portion 25 when engaged, i.e., such that detachment of the open/close valve 15 and the connecting device 23 cannot be performed. The specific form of the locking member 26 is not limited in particular, but the locking member 26 can be configured such that the locking member 26 that is rod-shaped can project from and withdraw into the cylindrical body 23*a*, as illustrated in FIG. 3, for example. The locking member 26 projects from the cylindrical body 23*a* and enters the connecting portion 25, thereby restricting the connecting portion 17 and the connecting portion 25 so as not to be capable of being detached. When the locking member 26 is withdrawn into the cylindrical body 23*a* and retracted from the connecting portion 25, the connecting portion 17 and the connecting portion 25 can be detached.

1.2.4. Injector

The injector 30 is disposed on the supply channel 22 (the supply channel 22*d* in the present embodiment), between the connecting device 23 and the fuel cell 21, and controls the supply of hydrogen to the fuel cell 21. Although specific form of the injector is not limited in particular, a flow control valve can be given.

1.2.5. Pressure Gauge

The pressure gauges 31 are pressure gauges that measure in-channel pressure of the supply channel 22 (the pressure inside the pipes) between the connecting devices 23 and the injector 30. Although the specific form of the pressure gauges 31 is not limited in particular in the present embodiment, a configuration is made to transmit pressure value data that is obtained to the control device 50.

1.3. Control Device

At the time of detaching the tank 11, the control device 50 determines whether the tank 11 can be detached. The control device 50 is a control device that performs operations so as to place the tank 11 in a detachable state when determination is made that the tank 11 can be detached, and when determination is made that the tank 11 cannot be detached, performs output for notification thereof. Accordingly, in the present embodiment, the control device 50 is configured to be capable of communication with the push rods 24 and the locking members 26 of the connecting devices 23, the injector 30, the pressure gauges 31, and the notification device 60.

Figure 4:
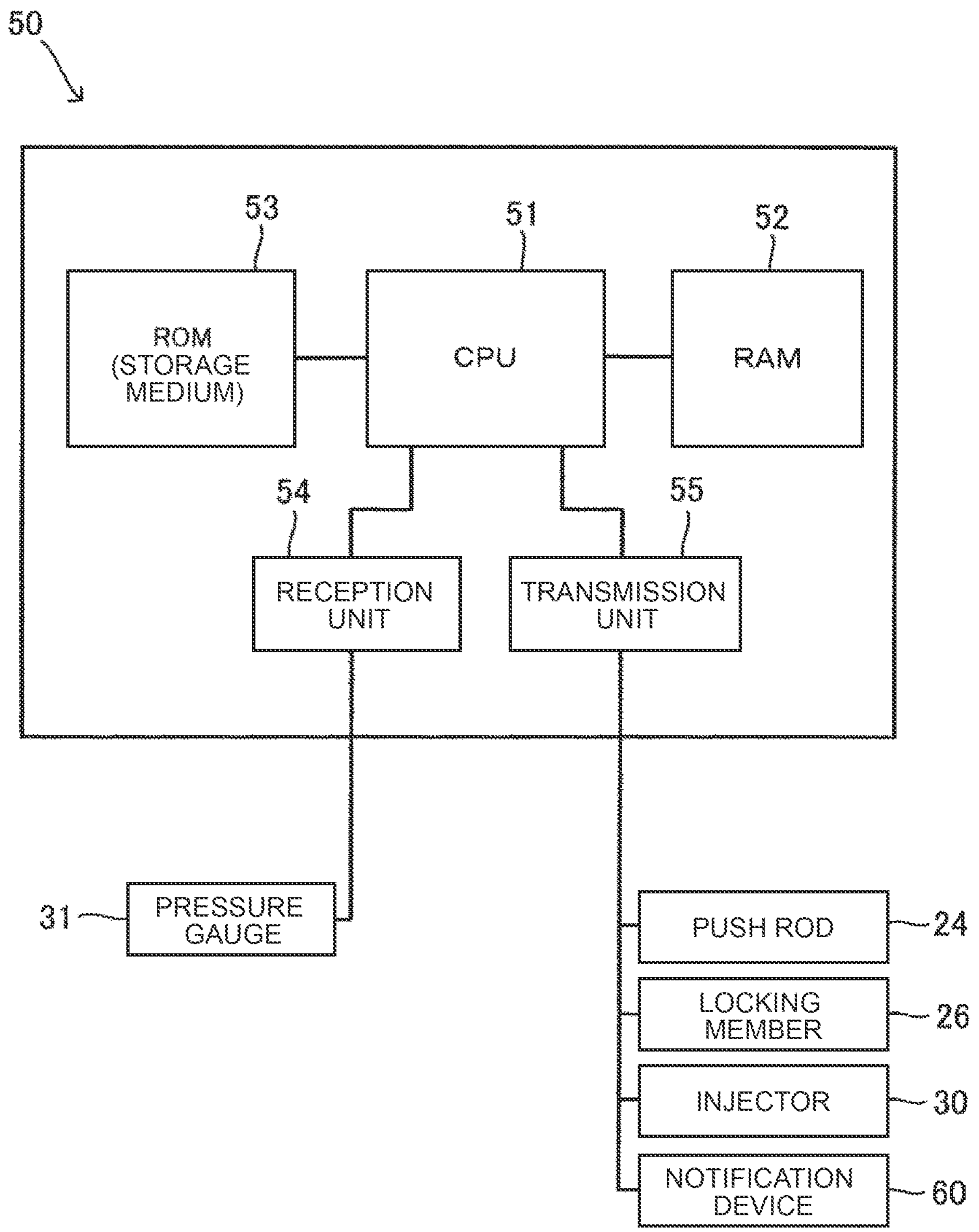
FIG. 4 is a diagram illustrating a control device.

As conceptually illustrated in FIG. 4, the control device 50 includes a central processing unit (CPU) 51 that is a processor and that performs computation, random-access memory (RAM) 52 that functions as a work area, read-only memory (ROM) 53 that functions as a recording medium, a reception unit 54 that is an interface through which the control device 50 receives information either wired or wirelessly, and a transmission unit 55 that is an interface through which the control device 50 externally sends information either wired or wirelessly. Accordingly, the control device 50 is configured such that the pressure gauges 31 are connected to the reception unit 54 and information is received therefrom. The control device 50 is configured such that the push rods 24, the locking members 26, the injector 30, and the notification device 60 are connected to the transmission unit 55 such that signals for operation thereof can be transmitted thereto.

Saved in the control device 50 is a program that, at the time of detaching the tank 11, determines whether the tank 11 can be detached, performs computational processing for operating each piece of equipment in accordance with the determination regarding whether detachment can be performed, and transmits signals for operation to each piece of equipment. In the control device 50, the CPU 51, the RAM 52, and the ROM 53 that serve as hardware resources operate cooperatively with the program. Specifically, the CPU 51 performs desired control by executing a computer program recorded in the ROM 53 in the RAM 52 that functions as a work area. Information that is acquired or generated by the CPU 51 is stored in the RAM 52. Further, a separate recording medium may be provided within the control device 50, or externally therefrom, and programs and various types of data may be recorded therein. Specific contents of control will be described later.

Such a control device 50 can typically be made up of a computer.

1.4. Notification Device

The notification device 60 is a device that, at the time of detachment of the tank 11, performs notification when the control device 50 determines that the tank 11 cannot be detached. Accordingly, the notification device 60 functions as a receiver for receiving a signal from the control device 50, which is a transmitter of the signal of this notification, and also performs specific notification. The notification method is not limited in particular, and may include any of an image display, a warning sound, sound, and light, or a combination of at least two or more of these. For example, an image display device can be used for the image display, a speaker can be used for the warning sound or the sound, and a lighting device can be used for the light.

2. Tank Detachment Control

The control that is performed when the tank 11 is detached in the gas supply system 10 will be described below.

2.1. Gas Supplying State

Figure 5:
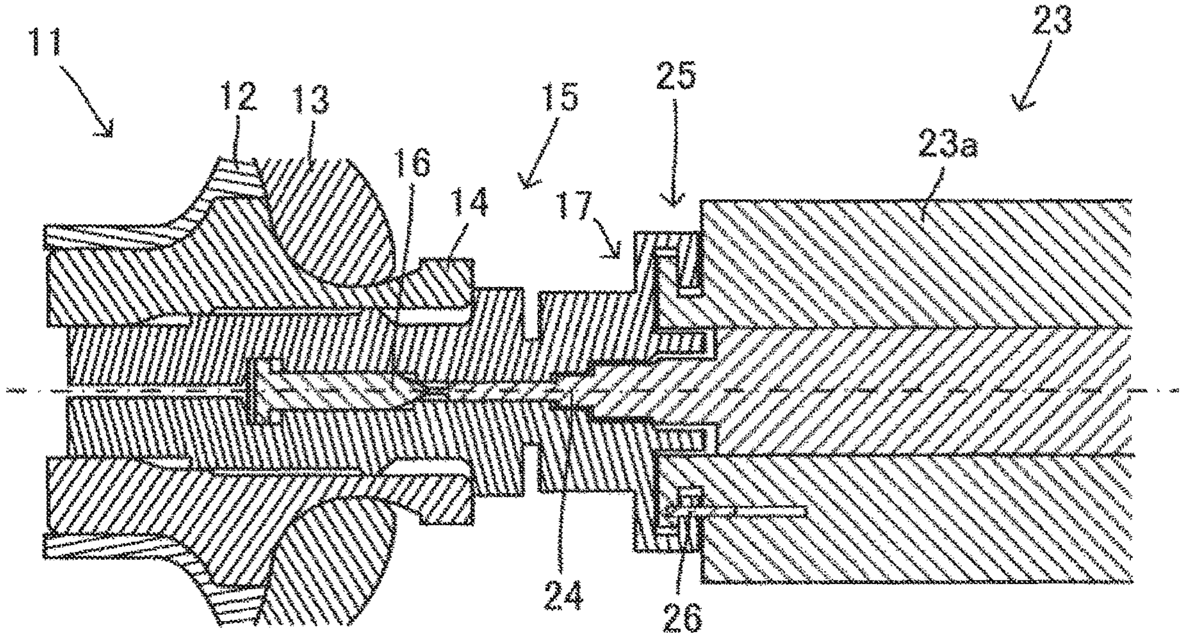
FIG. 5 is a diagram for describing a connected state of the open/close valve and the connecting device.

Prior to the detachment of the tank 11, hydrogen flows out from the tank 11 and is supplied to the fuel cell 21 over the supply channel 22. Electricity is generated at the fuel cell 21. At this time, the tank 11 is in a state of being connected to the gas consumption device 20, and the valve element 16 is open. FIG. 5 illustrates such a connection state between the tank 11 and the gas consumption device 20. FIG. 5 is a cross-section from the same perspective as in FIG. 3.

As can be understood from FIG. 5, when the tank 11 is connected to the gas consumption device 20 and is in a gas supplying state, the connecting portion 17 provided to the open/close valve 15 of the tank 11, and the connecting portion 25 provided to the connecting device 23 of the gas consumption device 20, are engaged. Also, at this time, the locking member 26 projects from the cylindrical body 23*a* and enters the connecting portion 25, thereby realizing a locked state. Further, the push rod 24 projects from the cylindrical body 23*a* and the distal end of the push rod 24 reaches the inner side of the open/close valve 15, thereby pressing the valve element 16. Thus, the open/close valve 15 is in an open state.

2.2 Flow of Tank Detachment

Figure 6:
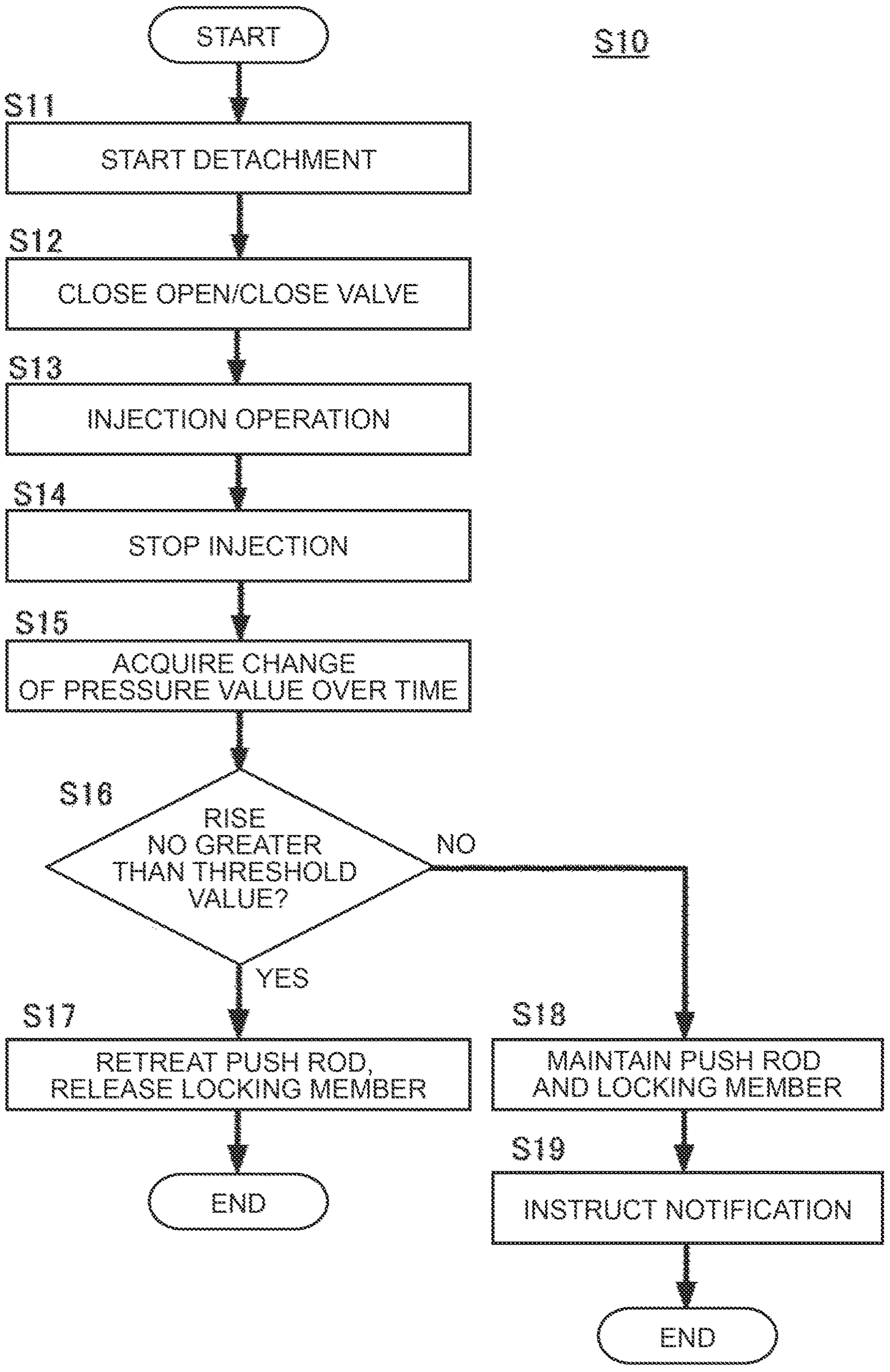
FIG. 6 is a diagram illustrating a flow of tank detachment control S10.

FIG. 6 shows a flow of tank detachment control S10 according to an embodiment. As can be understood from FIG. 6, the tank detachment control S10 includes processes S11 to S19. Each of these processes proceeds in accordance with a program stored in the control device 50, and each piece of equipment is operated according to commands from the control device 50. Each process will be described below.

2.2.1. Starting Detachment

In a process of starting detachment (S11), the control device 50 receives a signal that triggers the start of tank detachment. As a result, detachment of the tank 11 starts, and the tank detachment control S10 is performed. The signal that triggers the start of tank detachment is not limited in particular. A user may operate a detachment start switch (omitted from illustration) that is provided, or a signal may be emitted when the volume within the tank 11 decreases and falls below a predetermined pressure.

2.2.2. Closing Open/Close Valve

Figure 7:
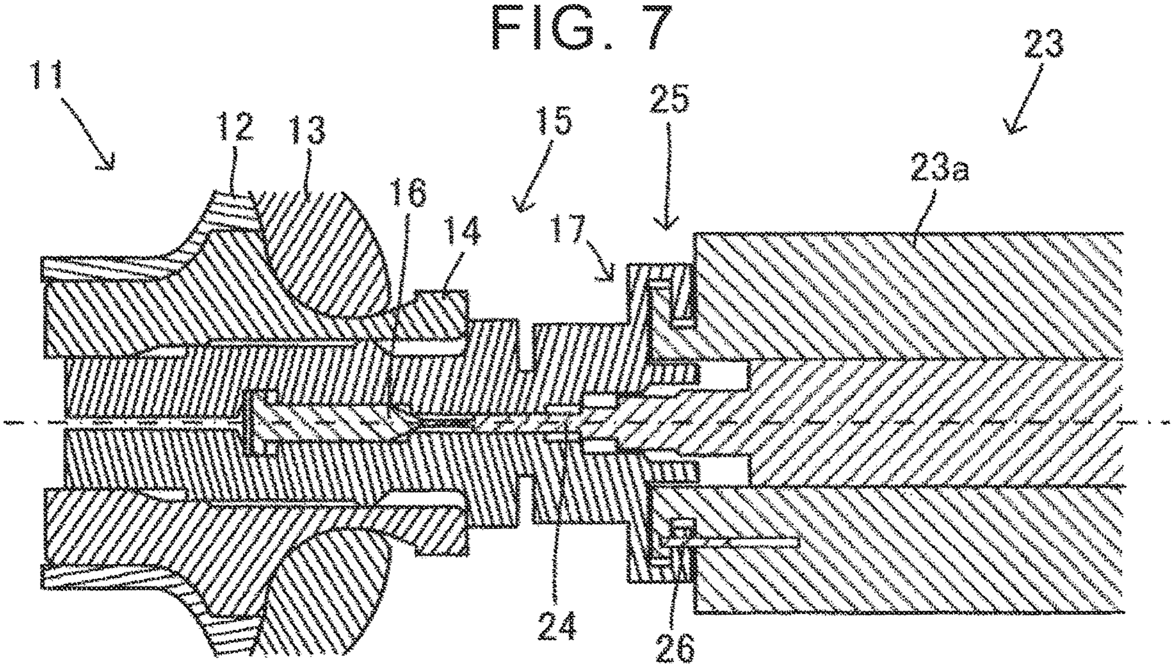
FIG. 7 is a diagram illustrating a process S12.

In a process of closing the open/close valve (S12), the control device 50 closes the open/close valve 15 in response to a signal for closing that is received in process S11. Specifically, the control device 50 closes the valve element 16 by moving the push rod 24 to release the pressing on the valve element 16. However, as illustrated in FIG. 7, the state in which the push rod 24 remains inside the open/close valve 15 while projecting from the cylindrical body 23*a* is maintained. Thus, the open/close valve 15 and the connecting device 23 are maintained in a state of communicating (however, the valve is closed, and accordingly communication with the inside of the tank is shut off) and sealing performance are maintained, and airtightness of the supply channel 22 is secured. This operation is performed for all the tanks 11 when multiple tanks 11 are disposed.

2.2.3. Injection Operations

In a process of injection operations (S13), the control device 50 operates the injector 30 to feed the hydrogen present in the channel of the supply channel 22 to the fuel cell 21. This causes the fuel cell 21 to generate electricity and to consume the hydrogen in the channel of the supply channel 22. The open/close valve 15 of the tank 11 is closed in process S12. Accordingly, no new gas is supplied from the tank 11 in a normal state, and the gas in the channel of the supply channel 22 is consumed in this process S13, whereby the pressure in the channel drops. The electricity obtained in this process S13 can be used to charge a secondary battery that is omitted from illustration, but is not limited to this in particular.

2.2.4. Stopping Injection

In a process of stopping injection (S14), the control device 50 stops the injector 30, after waiting for the gas in the channel of the supply channel 22 to be consumed in process S13. Accordingly, the inside of the supply channel 22 between the connecting device 23 and the injector 30 is shut off. The timing of stopping the injector 30 is not limited in particular, as long as a state can be obtained in which the hydrogen in the channel of the supply channel 22 is consumed to some extent and the pressure in the channel is reduced. For example, this process S14 can be performed after the control device 50 confirms that a predetermined amount of time elapsing after the injector 30 was operated in process S13, a certain amount of electricity being generated by the fuel cell 21 after the injector 30 is operated in process S13, or a value of the pressure gauge 31 acquired after the injector 30 is operated decreasing to a value lower than the pressure within the tank 11.

2.2.5. Acquisition of Change in Pressure Value Over Time

In a process of obtaining change in pressure value over time (S15), the control device 50 obtains the value of the pressure gauge 31 in time series, to obtain change in the pressure value. Thus, change in the in-channel pressure of the supply channel 22 shut off in process S14 is obtained.

2.2.6. Determination of Pressure Rise

In a process of pressure rise determination (S16), the control device 50 determines whether the pressure change obtained in process S15 is within a predetermined rising amount (threshold value) or less. When the pressure rise is within the predetermined amount, there is no problem with the sealing performance of the valve element 16 of the open/close valve 15 of the tank 11. Also, the hydrogen in the channel of the supply channel 22 is consumed in process S13, and accordingly hydrogen will not leak and not cause trouble even when the tank 11 is detached. Therefore, determination of Yes is made, and the flow advances to process S17. On the other hand, when the pressure rise exceeds the predetermined amount, there is a possibility that there is a problem with the sealing performance of the valve element 16 of the open/close valve 15. Also, hydrogen is in the channel of the supply channel 22, and accordingly hydrogen may leak to the surroundings when the tank 11 is detached, causing trouble. Therefore, determination of No is made, and the flow advances to process S18.

2.2.7. Process Following Determination that Detachment can be Performed

Figure 8:
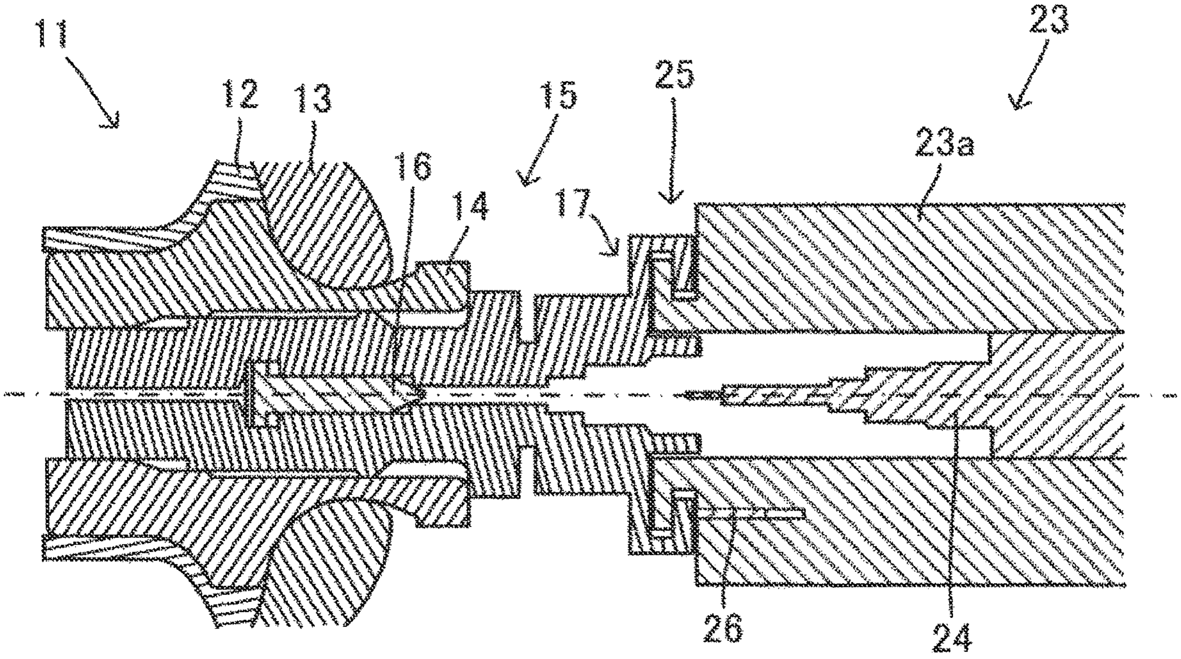
FIG. 8 is a diagram illustrating a process S17.

When determination of Yes is made in process S16, the flow advances to process S17. The control device 50 causes the push rod 24 to retreat, to detach the entire push rod 24 from the inside of the open/close valve 15, as illustrated in FIG. 8. Further, the control device 50 also causes the locking member 26 to retreat, such that the entire locking member 26 is retracted from the connecting portion 25. Thus, the tank 11 and the connecting device 23 can be detached. In the present embodiment, the tank 11 and the connecting device 23 are engaged by a C-mount. Accordingly, for example, a person who detaches the tank 11 may rotate the tank 11 and the connecting device 23 relative to each other to detach the tank 11, or the control device 50 may rotate the tank 11 and the connecting device 23 relative to each other to detach the tank 11.

2.2.8. Process Following Determination that Detachment Cannot be Performed

When determination of No is made in process S16, the flow advances to process S18, and the push rod 24 and the locking member 26 are maintained in the state of process S12 (FIG. 7). The flow then advances to process S19, and the notification device 60 makes notification thereof in accordance with to a command from the control device 50.

3. Effects, Etc.

According to the gas supply system described above, the possibility of a sealing failure in the tank can be detected, and trouble due to the sealing failure at the time of detaching the tank can be proactively averted.

What is claimed is:

1. A gas supply system comprising:
a gas consumption device;
a tank that stores gas to be supplied to the gas consumption device, and that is configured to be detachably attached to the gas consumption device; and
a control device, wherein
the gas consumption device includes a supply channel configured such that the gas flows through the supply channel, and a pressure sensor configured to obtain in-channel pressure of the supply channel,
the tank is configured to be connected to the supply channel, and is provided with an open/close valve at a portion where the tank is connected to the supply channel, and
the control device is configured such that, in response to the control device receiving a signal regarding a start of the detachment of the tank, the control device closes the open/close valve to stop supply of gas from the tank, stops consumption of the gas by the gas consumption device after the gas in the supply channel is consumed, and the control device is further configured such that it permits detachment of the tank when the pressure rise is no greater than a predetermined threshold value.

2. The gas supply system according to claim 1, wherein:
the gas consumption device includes a connecting device and a locking member that is configured to restrict detachment of the tank from the gas consumption device, the locking member projecting from the connecting device and entering into the connecting portion in a status that the connecting device and the open/close valve are engaged; and
the control device is configured to perform operations to release restriction by the locking member when the detachment of the tank is permitted.

3. The gas supply system according to claim 1, wherein:
the open/close valve is a check valve;
the gas consumption device includes a push rod;
the check valve is configured to open by the push rod pressing the check valve;
the check valve is configured to close by the push rod releasing pressing of the check valve; and
the control device is configured to perform operations of the push rod such that the check valve is closed when the tank is detached.

4. The gas supply system according to claim 1, wherein the open/close valve of the tank is a solenoid valve.

5. The gas supply system according to claim 1, wherein the control device is configured to output a result to be externally notified when a computation result that does not permit the detachment of the tank is obtained.

6. The gas supply system according to claim 5, further comprising a receiver that receives the result to be externally notified and performs notification.

* * * * *